J. SCHWERTNER.
AUTOMATIC PLAYING APPARATUS.
APPLICATION FILED MAR. 30, 1911.
1,133,581.
Patented Mar. 30, 1915.
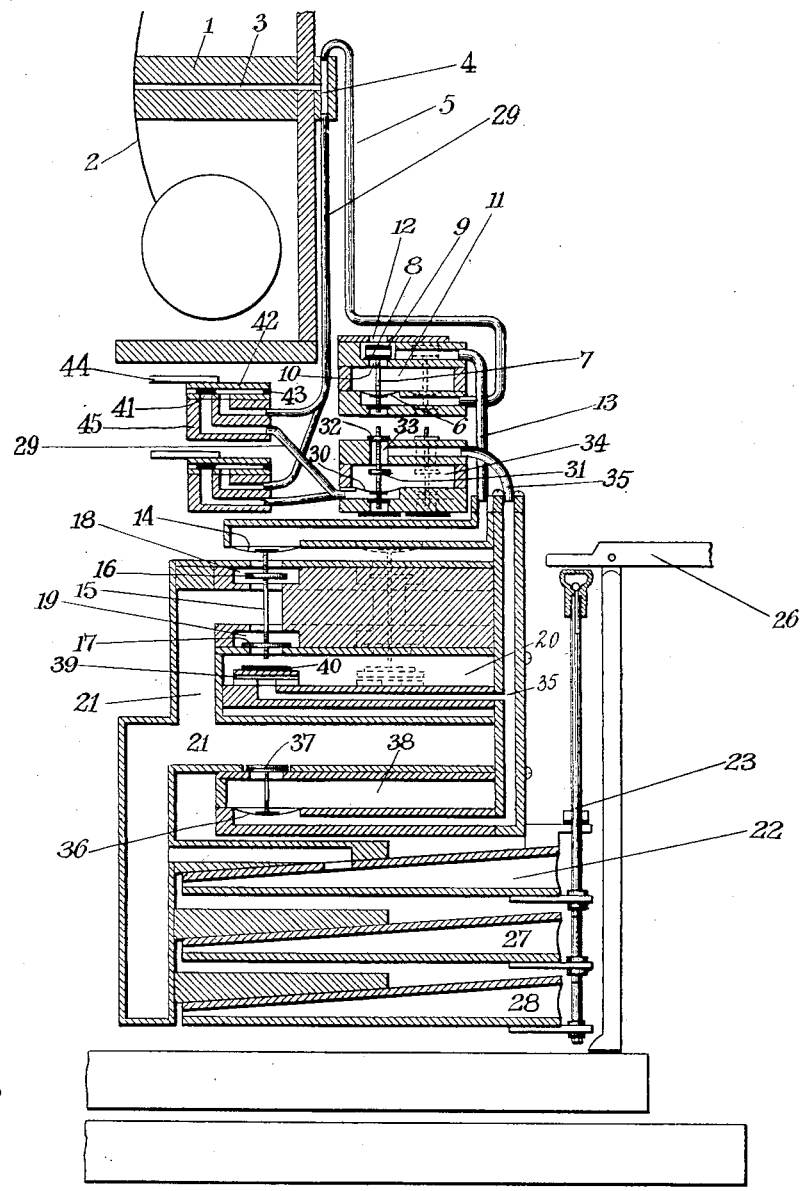
Witnesses:
Inventor
Joseph Schwertner
By his Attorneys
Kenyon & Kenyon

UNITED STATES PATENT OFFICE.

JOSEPH SCHWERTNER, OF NEW YORK, N. Y., ASSIGNOR, BY DIRECT AND MESNE ASSIGNMENTS, TO HEERWAGEN COMPANY, A CORPORATION OF NEW YORK.

AUTOMATIC PLAYING APPARATUS.

1,133,581.        Specification of Letters Patent.        Patented Mar. 30, 1915.

Application filed March 30, 1911. Serial No. 617,968.

*To all whom it may concern:*

Be it known that I, JOSEPH SCHWERTNER, a citizen of the United States, and a resident of New York, county of New York, and State of New York, have invented certain new and useful Improvements in Automatic Playing Apparatus, of which the following is a specification.

My invention relates to improvements in pneumatic playing apparatus, and more especially to automatic playing apparatus controlled by any well known form of tracker board and sheet.

One object of my invention is to provide an arrangement in which the notes of the instrument or apparatus may be accented as desired and in which the accenting may be much sharper and more distinct than has heretofore been possible in such arrangements, and in which the accented notes respond more quickly than in prior devices of the class described.

A further object of my invention is to provide an arrangement of the parts which are especially compact and take up very little room and in which a number of the parts are comparatively few so that the arrangement is economical and efficient in construction as well as in operation.

Further objects, features and advantages will more clearly appear from the detailed description given below taken in connection with the accompanying drawing which illustrates in vertical section a portion of an apparatus embodying one form of my invention.

Referring to the drawing, 1 represents a tracker board of any well known form, and 2 the tracker sheet. The tracker board is provided with the usual openings 3 corresponding with the various notes to be played. The tracker ducts 3 branch at 4 with branch 5 leading to a primary pneumatic 6 operating a spindle 7 and valve closures 8 and 9. The valve closure 8 is arranged to normally close a passage 10 leading to a wind chest 11. The valve closure 9 is arranged to close a passage 12 leading to the atmosphere. The passages 10 and 12 are arranged to be connected with a wind duct 13 which leads to a secondary pneumatic 14. Secondary pneumatic 14 operates a spindle 15 carrying valve closures 16 and 17. The valve closure 16 operates in the wind passage 18 leading to the atmosphere, and the valve closure 17 operates in the wind passage 19 leading to a low pressure wind trunk 20. The wind passages 18 and 19 also lead to a wind passage 21 which feeds power pneumatic 22, which through the rod 23 and member 26 operates a striker of the instrument in a well known manner. Other power pneumatics 27 and 28 are shown, these being arranged to operate the strikers in a similar manner to produce adjacent or other notes on the instrument. Also leading from the junction 4 of the tracker duct 3 is a wind duct 29 which leads to a primary pneumatic 30. Primary pneumatic 30 operates a spindle carrying valve closures 31 and 32. Valve closure 31 is arranged to close passage 33 to the external atmosphere. The valve 32 is arranged to close or open the passage 33 to a wind chest 34. Connecting with the passage 33 is a wind duct 35 which leads to a pneumatic 36 which operates a valve closure 37. The valve closure 37 is arranged to open or close the wind passage 21 directly with a high pressure wind trunk 38. The wind duct 35 also leads to an operating pneumatic 39, which operating pneumatic is located within the low pressure wind trunk 20 and carries a valve or valve closure 40 arranged to close the wind passage 19, and consequently the wind passage 21 to the low pressure wind trunk 20.

Located within the wind duct 29 is a valve 41 arranged to open or close said wind duct as desired. For this purpose the valve is carried by a member 42 pivotally mounted at 43, and when it is desired to open the wind duct 29 the member 44 is raised. The member 42 and block 45 where they adjoin one another are surrounded by a flexible membrane in a well known manner so as to keep out the external air from the duct 29 at this point. It will therefore be seen that upon raising the valve 41, the wind duct 29 is opened so that air may pass from the tracker board through the wind duct 29 directly to the primary pneumatic 30.

The operation of the arrangement is as follows: When an opening or perforation in the tracker sheet 2 coincides with one of the tracker ducts 3, atmospheric air passes therethrough through the duct 5 and to the pneumatic 6. Since there is an exhaustion normally maintained in the chest 11 pneumatic pressure on the pneumatic 6 causes the same to raise the valve spindle 7, raising the valve closures 8 and 9, thus closing the duct 13 to the atmosphere and opening it to the exhaustion within the chest 11. This produces suction within the duct 13 and consequently at the pneumatic 14 and atmospheric pressure causes the pneumatic 14 to operate the valve spindle 15 raising the valve closure 16 to close the passage 21 to the external atmosphere and raising the valve closure 17 to open the passage 21 to the low exhaust within the low pressure wind trunk 20. This causes an exhaustion within the passage 21 and consequently within the power pneumatic 22 causing the power pneumatic 22 to collapse and operate its corresponding striker to produce a note in any well known manner. In the above operation of the system the note will be sounded with a force or volume corresponding to the pressure or suction within the low pressure wind trunk 20. With the above operation it has been assumed that the valve 41 is closed so that the primary pneumatic 30 will not operate. If, however, it is desired to accent a note corresponding to the power pneumatic 22 the valve closure 41 is raised thus opening the wind duct 29 so that atmospheric air also passes from the tracker through the wind duct 29 and operates the primary pneumatic 30. The primary pneumatic 30 therefore raises the valve closure 31 to close the duct 35 and the wind chest 34 and opens the wind duct 35 to the atmospheric air by the raising of the valve closure 32. Atmospheric air, then passes through the wind duct 35 and the atmospheric pressure, operates the pneumatic 36 to raise the valve closure 37, thus opening the passage 21 to the high exhaust wind trunk 38 so that the increased suction now operates the pneumatic 22 to cause the striker to operate with increased force, thus accenting the note as desired. The amount of accentuation may be made as much as desired by varying the pressure or suction within the wind trunk 28 in any well known manner. It will, however, be noticed that whenever the valve 37 is raised the valve 17 is also raised so that if nothing further were done we would have the wind passage 21 open to both wind trunks and there would accordingly follow an equalization of the pressures thus preventing the accenting as desired. In order to overcome this the valve 40 is provided within the wind trunk 20. At the same time that atmospheric air passes through the duct 35 to operate the pneumatic 36 and valve 37, it also passes to the pneumatic 39 to operate same and cause it to raise the valve closure 40, to close the passage 19 so as to completely close the wind passage 21 and its power pneumatic 22 to the low pressure wind trunk 20. Thus it will be seen that both valve closures 37 and 40 operate simultaneously, one to close the wind trunk 20 to the power pneumatic, and the other to open the wind trunk 38 to the power pneumatic. Since when the valve 37 is open a greater exhaustion exists within the passage 21, this exhaustion being greater than that in the wind trunk 20, it will tend to hold the valve closure 40 up as desired. If the valve closure 40 were placed upon the opposite side of the passage 19 or worked in the opposite direction there would be a tendency for the greater exhaustion in the passage 21 to open the valve.

By my improved arrangement it will be seen that each wind trunk 20 and 38 is directly connected to the power pneumatic 22 by only a single valve. That is, there is only one valve to be opened to connect either one of the wind ducts to the operating pneumatic. This is especially advantageous since not only is the number of parts decreased and the arrangement made more compact but the power pneumatics are made much more quickly responsive since the passage which the air takes between the power pneumatic and its wind trunk is made less tortuous and the operation is made dependent only upon the operation of a single valve. Thus each of the wind trunks 20 and 38 is made common to all of the various power pneumatics 22, 27, 28, etc., and there is a single valve for each power pneumatic for directly connecting the same with the low pressure wind trunk 20, and a single valve 37 for directly connecting each power pneumatic with the high pressure wind trunk 38. The valve 40 is operated independently of the other valves so that the seating of the same upon its valve seat does not depend upon the accurate seating of any other valve.

Of course, it will be understood that any pressures or suctions desired may be made to exist within the wind trunks 20 and 38 and by suitable apparatus the pressure or suction within the wind trunk 28 may be made to vary as desired in order to vary the amount of accenting or vary the volume of the accentuation of the music being played. This may be done in any well known manner. Therefore, although I have spoken of the wind trunk 20 as a low pressure wind trunk and the wind trunk 28 as a high pressure wind trunk, it will be obvious that the relative pressures existing within these wind trunks may be made to vary as desired, and it may be found desirable while playing certain music to have the same pressure within both wind trunks 20 and 38. It will further appear that the raising of the valve 41 does not in and of itself change the relative operating pressures in the apparatus. It is only when the perforation in the tracker 2 registers with its corresponding tracker duct corresponding to the note to be accented that the atmospheric air enters the duct 29 to operate the primary pneumatic 30 which in turn operates the valve 32 to admit atmospheric air to the duct 35 to operate the secondary pneumatic 36. It will therefore appear that the valves 17 and 37 are controlled through exactly the same perforations in the tracker sheet 2 and the same tracker ducts at all times when their corresponding valves 41 are raised. Of course if the valve or valves 41 are not raised this renders their corresponding valves 37 inoperative and the apparatus operates with the pressure or exhaust existing within the wind trunk 20. The valves 40 and 37 when operated, are operated simultaneously although independently, to close or shut off the low pressure wind trunk and open the high pressure wind trunk 38 to the corresponding power pneumatic.

Although I have described my improvements in great detail nevertheless I do not wish to be limited to such details except as clearly specified in the appended claims since many changes and modifications may well be made within the spirit and scope of my invention in its broadest aspects.

However, having fully and clearly described my improvements, what I claim as new and desire to secure by Letters Patent is:

1. An arrangement of the class described, having a tracker board and sheet, a plurality of power pneumatics, a wind passage for each pneumatic leading thereto, a wind trunk common to said pneumatics, an opening from each wind passage to said wind trunk, a valve closure normally closing each opening, means controlled from the tracker to operate said valve closure to open its passage to the wind trunk, an independently movable valve closure for each of said openings for closing the same, a second wind trunk common to said passages, an opening from each passage to said second wind trunk, a valve closure for each of said last mentioned openings, pneumatics for operating each of said last mentioned valve closures and said independently movable valve closures, and a common wind duct for controlling each of said third mentioned valve closures and its corresponding independently movable valve closure.

2. An arrangement of the class described, having a plurality of power pneumatics and strikers operated thereby, a wind trunk common to said pneumatics, a wind passage leading from each pneumatic to said wind trunk and to the atmosphere, a valve for closing each passage to the atmosphere, a second valve for opening each passage to the wind trunk to connect the wind trunk directly with the pneumatic, a third valve for closing the passage to the wind trunk, a second wind trunk common to said pneumatics, a wind passage from each pneumatic to said second wind trunk and a fourth valve for each pneumatic for opening said last mentioned wind passage to connect the pneumatic directly with the second wind trunk, a tracker board and sheet, means for operating said first and second valves controlled by the tracker board and sheet, separate pneumatics for operating said third and fourth valves, a common wind passage leading to the pneumatics of said third and fourth valves, and controlling means connected with each of said last mentioned passages to control said third and fourth valves simultaneously.

3. The combination of a plurality of power pneumatics, a low pressure wind trunk, a valve for each pneumatic for connecting the same with the wind trunk, a tracker board and sheet, means controlled by the openings of the tracker board and sheet for operating said valve, a high pressure wind trunk, a valve for each pneumatic for opening the high pressure wind trunk to the pneumatic and means controlled by the same openings of the tracker board and sheet for operating said last mentioned valve.

4. The combination of a plurality of power pneumatics, a low pressure wind trunk, a valve for each pneumatic for connecting the same with the wind trunk, a tracker board and sheet, means controlled by the openings of the tracker board and sheet for operating said valve, a high pressure wind trunk, a valve for each pneumatic for opening the high pressure wind trunk to the pneumatic and means controlled by the same openings of the tracker board and sheet for operating said last mentioned valve, and a valve for closing each pneumatic to the low pressure wind trunk controlled by said last mentioned means.

5. The combination of a plurality of power pneumatics, a low pressure wind trunk, a valve for each pneumatic for connecting the same with the wind trunk, a tracker board and sheet, a primary pneumatic controlled by the openings of the tracker board and sheet for operating said valve, a high pressure wind trunk, a valve for each pneumatic for opening the high pressure wind trunk to the pneumatic and a primary pneumatic controlled by the same openings of the tracker board and sheet for operating said last mentioned valve, means for rendering said last mentioned valve inoperative, and a valve for closing each pneumatic to the low pressure wind trunk controlled by said last mentioned primary pneumatic.

6. The combination of a plurality of power pneumatics and strikers operated thereby, a low pressure wind trunk, a valve for each pneumatic for connecting the same directly with the low pressure wind trunk common to said power pneumatics, a tracker board and sheet, a pneumatic for operating said valve, a primary pneumatic for controlling said operating pneumatic and controlled by the tracker board and sheet, a high pressure wind trunk common to said power pneumatics, a valve for each pneumatic for connecting the same directly with the high pressure wind trunk, a pneumatic for operating said last mentioned valve, and a primary pneumatic for controlling said last mentioned operating pneumatic and controlled by the tracker board and sheet, and a valve for rendering one of said primaries inoperative.

7. The combination of a plurality of power pneumatics and strikers operated thereby, a low pressure wind trunk, a valve for each pneumatic for connecting the same directly with the low pressure wind trunk common to said power pneumatics, a tracker board and sheet, a pneumatic for operating said valve, a primary pneumatic for controlling said operating pneumatic and controlled by the tracker board and sheet, a high pressure wind trunk common to said power pneumatics, a valve for each pneumatic for connecting the same directly with the high pressure wind trunk, a pneumatic for operating said last mentioned valve, and a primary pneumatic for controlling said last mentioned operating pneumatic and controlled by the tracker board and sheet, a valve for closing each power pneumatic to the low pressure trunk and a pneumatic for operating said last mentioned valve and controlled by said last mentioned primary pneumatic.

8. An arrangement of the class described having a tracker board with its tracker openings, two primary pneumatics connected to be operated from each tracker opening, a secondary pneumatic connected to be operated from each primary pneumatic, a power pneumatic, a high pressure wind trunk and a low pressure wind trunk, a valve controlled by one secondary pneumatic for connecting the power pneumatic with the low pressure wind trunk and a valve controlled by the other secondary pneumatic for connecting the power pneumatic with the high pressure wind trunk, and means for rendering said last mentioned valve inoperative.

9. The combination of a tracker board with its tracker openings, two primary pneumatics connected to be operated from each tracker opening, a secondary pneumatic connected to be operated from each primary pneumatic, a power pneumatic, a high pressure wind trunk and a low pressure wind trunk, a valve controlled by one secondary pneumatic for connecting the power pneumatic with the low pressure wind trunk and a valve controlled by the other secondary pneumatic for connecting the power pneumatic with the high pressure wind trunk, and a valve and operating pneumatic controlled by one of the primary pneumatics for closing the power pneumatic to the low pressure wind trunk.

10. The combination of a tracker board and its openings, a power pneumatic, a low pressure wind trunk, a valve for opening the low pressure wind trunk directly to the power pneumatic, a wind duct from each tracker opening and means connected therewith for controlling the operation of said valve, a high pressure wind trunk, a valve for opening the high pressure wind trunk directly to the power pneumatic, a second wind duct leading from each tracker opening and means connected therewith for controlling the operation of said last mentioned valve, and means for rendering said last mentioned valve inoperative.

11. The combination of a tracker board and its openings, a power pneumatic, a low pressure wind trunk, a valve for opening the low pressure wind trunk directly to the power pneumatics, a wind duct from each tracker opening and means connected therewith for controlling the operation of said valve, a high pressure wind trunk, a valve for opening the high pressure wind trunk directly to the power pneumatic, a second wind duct leading from each tracker opening and means connected therewith for controlling the operation of said last mentioned valve, and a valve in each of said second mentioned wind ducts for rendering said last mentioned means inoperative.

12. The combination of a tracker board and its openings, a power pneumatic, a low pressure wind trunk, a valve for opening the low pressure wind trunk directly to the power pneumatic, a wind duct from each tracker opening and means connected therewith for controlling the operation of said valve, a high pressure wind trunk, a valve for opening the high pressure wind trunk directly to the power pneumatic, a second wind duct leading from each tracker opening and means connected therewith for controlling the operation of said last mentioned valve, means for rendering one of said valves inoperative, and a valve for closing said power pneumatic to the low pressure trunk, said valve being controlled by said last mentioned means.

13. The combination of a tracker board and its openings, a power pneumatic, a low pressure wind trunk, a valve for opening the low pressure wind trunk directly to the power pneumatic, a wind duct from each tracker opening and means connected therewith for controlling the operation of said valve, a high pressure wind trunk, a valve for opening the high pressure wind trunk directly to the power pneumatic, a second wind duct leading from each tracker opening and means connected therewith for controlling the operation of said last mentioned valve, and a valve for closing said power pneumatic to the low pressure trunk, said valve being controlled by said last mentioned means, and a valve in each of said second mentioned wind ducts for rendering said last mentioned means inoperative.

14. The combination of a tracker board with its tracker openings, two primary pneumatics connected to be operated from each tracker opening, a secondary pneumatic connected to be operated from each primary pneumatic, a power pneumatic, a high pressure wind trunk and a low pressure wind trunk, a valve controlled by one secondary pneumatic for connecting the power pneumatic with the low pressure wind trunk and a valve controlled by the other secondary pneumatic for connecting the power pneumatic with the high pressure wind trunk, and a valve and operating pneumatic controlled by one of the primary pneumatics for closing the power pneumatic to the low pressure wind trunk, said last mentioned valve and its operating pneumatic being within the low pressure wind trunk.

15. The combination of a tracker board and its openings, a power pneumatic, a low pressure wind trunk, a valve for opening the low pressure wind trunk directly to the power pneumatic, a wind duct from each tracker opening and means connected therewith for controlling the operation of said valve, a high pressure wind trunk, a valve for opening the high pressure wind trunk directly to the power pneumatic, a second wind duct leading from each tracker opening and means connected therewith for controlling the operation of said last mentioned valve and means for rendering one of said valves inoperative.

16. The combination of a tracker board and its openings, a power pneumatic, a low pressure wind trunk, a valve for opening the low pressure wind trunk directly to the power pneumatics, a wind duct from each tracker opening and a primary pneumatic connected therewith for controlling the operation of said valve, a high pressure wind trunk, a valve for opening the high pressure wind trunk directly to the power pneumatic, a second wind duct leading from each tracker opening and a primary pneumatic connected therewith for controlling the operation of said last mentioned valve, and a valve in each of said second mentioned wind ducts for rendering said last mentioned means inoperative.

17. The combination of a tracker board and its openings, a power pneumatic, a low pressure wind trunk, a valve for opening the low pressure wind trunk directly to the power pneumatic, a wind duct from each tracker opening and means connected therewith for controlling the operation of said valve, a high pressure wind trunk, a valve for opening the high pressure wind trunk directly to the power pneumatic, a second wind duct leading from each tracker opening and a primary pneumatic connected therewith for controlling the operation of said last mentioned valve, and a valve for closing the power pneumatic to the low pressure wind trunk, said valve being controlled by said last mentioned primary pneumatic and being situated within the low pressure wind trunk.

18. The combination of a plurality of power pneumatics, a high pressure wind trunk and a low pressure wind trunk, both lying in substantially the same vertical plane, wind passages from each trunk to each power pneumatic, three valves controlling the wind passages from each power pneumatic to the trunks and a separate pneumatic for operating each valve.

19. The combination of a plurality of power pneumatics, a high pressure wind trunk and a low pressure wind trunk, both lying in substantially the same vertical plane and wind passages from each trunk to each power pneumatic, a pneumatic and valve closure for opening the connection of the power pneumatic to one wind trunk, a pneumatic and valve closure for closing said connection, and a pneumatic and valve closure for opening the connection of the power pneumatic to the other wind trunk.

20. The combination of a plurality of power pneumatics, a high pressure wind trunk and a low pressure wind trunk, wind passages from each trunk to each power pneumatic, a pneumatic and valve closure operated thereby for opening the connection of the power pneumatic to one wind trunk, a pneumatic and valve closure for closing said connection and a pneumatic and valve closure for opening the connection of the power pneumatic to the other wind trunk.

21. The combination of a tracker board with its tracker openings, two primary pneumatics connected to be operated from each tracker opening, a power pneumatic, and means whereby the operation of one of the primary pneumatics causes the operation of the power pneumatic with a predetermined power, means whereby the operation of the other primary pneumatic causes the operation of the power pneumatic with a greater power to accent the note being played, and a valve for rendering one of said primaries inoperative.

22. The combination of a plurality of power pneumatics, a high pressure wind trunk and a lower pressure wind trunk, wind passages from each trunk to each power pneumatic, a pneumatic and valve closure operated thereby for opening the connection of the power pneumatic to one wind trunk, a pneumatic and valve closure for closing said connection, said last mentioned pneumatic and valve closure being arranged in said last mentioned wind trunk, and a pneumatic and valve closure for opening the connection of the power pneumatic to the other wind trunk.

In testimony whereof, I have signed my name to this specification, in the presence of two subscribing witnesses.

JOSEPH SCHWERTNER.

Witnesses:
GORHAM CROSBY,
EDWIN SEGER.

Copies of this patent may be obtained for five cents each, by addressing the "Commissioner of Patents, Washington, D. C."

It is hereby certified that in Letters Patent No. 1,133,581, granted March 30, 1915, upon the application of Joseph Schwertner, of New York, N. Y., for an improvement in "Automatic Playing Apparatus," an error appears in the printed specification requiring correction as follows: Page 5, line 130, for the word "lower" read *low;* and that the said Letters Patent should be read with this correction therein that the same may conform to the record of the case in the Patent Office.

Signed and sealed this 4th day of May, A. D., 1915.

[SEAL.]

R. F. WHITEHEAD,

*Acting Commissioner of Patents.*